(12) United States Patent
Barathalwar

(10) Patent No.: US 9,485,795 B2
(45) Date of Patent: Nov. 1, 2016

(54) PROXIMITY-BASED COUPLING SERVICE

(75) Inventor: Raguraman Barathalwar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 95 days.

(21) Appl. No.: 13/977,053

(22) PCT Filed: Mar. 31, 2012

(86) PCT No.: PCT/US2012/031764
§ 371 (c)(1),
(2), (4) Date: Dec. 17, 2014

(87) PCT Pub. No.: WO2013/147917
PCT Pub. Date: Oct. 3, 2013

(65) Prior Publication Data
US 2016/0113048 A1  Apr. 21, 2016

(51) Int. Cl.
H04B 7/15 (2006.01)
H04W 76/02 (2009.01)
H04W 8/00 (2009.01)
H04W 84/12 (2009.01)
H04W 88/04 (2009.01)
(Continued)

(52) U.S. Cl.
CPC ............ *H04W 76/023* (2013.01); *H04W 8/005* (2013.01); *H04W 84/12* (2013.01); *H04W 88/04* (2013.01); *H04W 88/06* (2013.01); *H04W 88/10* (2013.01)

(58) Field of Classification Search
CPC ... H04W 84/12; H04W 8/005; H04W 48/14; H04W 76/02; H04W 84/18; H04W 4/008; H04W 48/16; H04W 4/02; H04W 4/08

USPC ............ 455/11.1, 41.1, 41.2, 41.3, 519, 455/414.1–414.4, 422.1, 403, 426.1, 426.2, 455/445, 550.1, 456.1–457, 466; 370/338, 370/328, 329, 260, 252, 254
See application file for complete search history.

(56) References Cited

U.S. PATENT DOCUMENTS 8,131,209 B1  3/2012  Chen et al.
2002/0184310 A1 * 12/2002  Traversat ............. G06F 9/4416
709/204

(Continued)

FOREIGN PATENT DOCUMENTS

JP  2013-214803 A  10/2013
WO  2012/000522 A1  1/2012

OTHER PUBLICATIONS

International Preliminary Report on Patentability for PCT Application No. PCT/US2012/031764, mailed Dec. 24, 2014, 10 pages.
European Search Report received for EP Patent Application No. 12872841.7, mailed Oct. 19, 2015, 7 pages.
Office Action and Search Report for Japanese Patent Application No. 2015-503178, mailed Nov. 10, 2015, 11 pages including 6 pages of English translation.

(Continued)

*Primary Examiner* — Keith Ferguson
(74) *Attorney, Agent, or Firm* — Jordan IP Law LLC

(57) ABSTRACT

Systems and methods may provide for implementing a proximity-based coupling service. In one example, the method may include detecting, utilizing a first communication protocol, the presence of a second device by a first device, initiating a wireless network utilizing a second communication protocol, wherein the first device is to serve as a software-enabled access point (SoftAP), and configuring the second device to join the wireless network utilizing the second communication protocol.

30 Claims, 2 Drawing Sheets

(51) Int. Cl.
*H04W 88/06* (2009.01)
*H04W 88/10* (2009.01)

(56) References Cited

U.S. PATENT DOCUMENTS

2010/0165879 A1 7/2010 Gupta et al.
2011/0275316 A1 11/2011 Suumäki et al.
2011/0310863 A1 12/2011 Shieh

OTHER PUBLICATIONS

Wi-Fi Alliance Technical Committee P2P Task Group, Wi-Fi Peer-to-Peer (P2P) Technical Specification Version 1.2, Dec. 14, 2011, 5 pages.

International Search Report and Written Opinion received for PCT application No. PCT/US2012/031764, mailed on Nov. 28, 2012, 9 pages.

* cited by examiner

PROXIMITY-BASED COUPLING SERVICE

BACKGROUND

1. Technical Field

Embodiments generally relate to a coupling service for proximate devices. More particularly, embodiments relate to utilizing onboard radio transmitters to generate a wireless network between proximate devices.

2. Discussion

Generally, connecting a first device to a second device via Wi-Fi requires the use of a hardware router host that facilitates a Wi-Fi network, such as a personal area network (PAN). However, a hardware router may not always be available to serve as host.

In other cases, a software router may be used. However, establishing a Wi-Fi network utilizing a software router may difficult as, among other things, there may no protocol for exchanging network credentials and device information (e.g., IP information) between devices, or resolving which device will function as network host.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
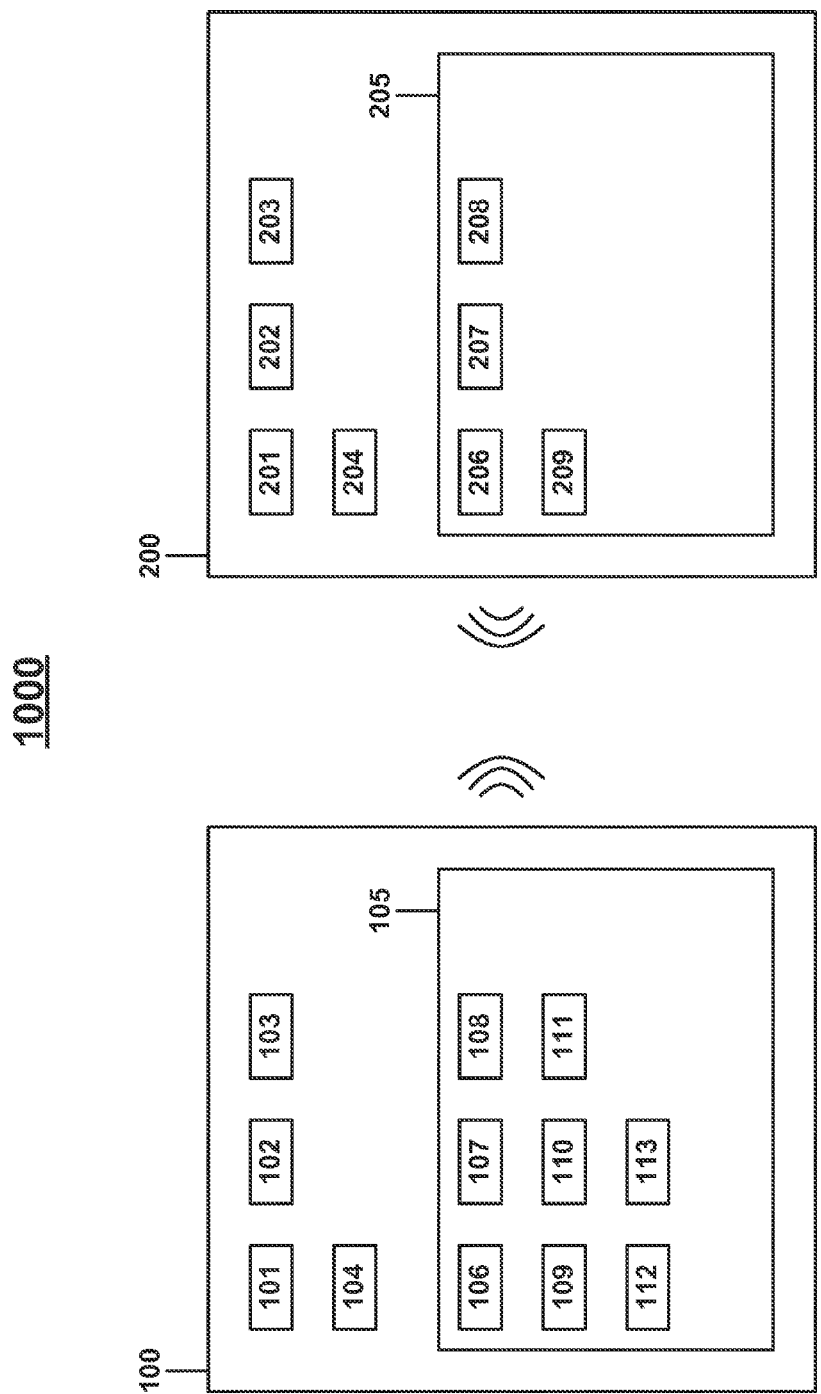
FIG. 1 is a block diagram of an example of a computing system to implement a proximity-based coupling service in accordance with an embodiment of the invention.

Turning now to FIG. 1, a block diagram of a computer system 1000 for implementing a proximity-based coupling service is shown. The computer system 1000 may include a first device 100 and a second device 200.

The first device 100 may be, among other things, any programmable machine that may carry out a sequence of logical operations. Examples of the first device 100 may include a laptop, desktop, personal digital assistant (PDA), media player, a mobile Internet device (MID), any smart device such as a smart phone, smart tablet, smart TV, or the like. In this embodiment, the first device 100 may be a user device such as a tablet device. The first device 100 may include a first device processor 101, a first device interface 102, a first device first transceiver 103, a first device second transceiver 104, and a first device memory component 105.

The first device processor 101 may include a processing component that may be utilized to execute computer-readable executable instructions. For example, as will be discussed in greater detail, the first device processor 101 may be configured to execute various software applications relating to a proximity-based coupling service.

The first device interface 102 may be a component configured to allow a user to interact with the user device 100. For example, in this embodiment, the user device interface 102 may be a tablet device screen including a graphical user interface (GUI). In other embodiments, the user device interface 102 may be a laptop screen, a tablet device screen, a desktop monitor, or the like.

The first device first transceiver 103 and the first device second transceiver 104 may be transmitter/receiver devices that enable the first device 100 to wirelessly communicate with other devices (e.g., the second device 200). In this embodiment, the first device first transceiver 103 may be configured to communicate wirelessly via Wi-Fi (e.g., LAN/MAN Wireless LANS (Wi-Fi), IEEE 802.16-2004), and the first device second transceiver 104 may be configured to communicate via Bluetooth (e.g., IEEE 802.15.1-2005, Wireless Personal Area Networks). In other embodiments, the first device first transceiver 103 and the first device second transceiver 104 may be configured to communicate via various other communication protocols, such as IEEE 802.16-2004, LAN/MAN Broadband Wireless LANS (Wi-MAX), Zigbee (IEEE 802.15.4), etc.), a cellular telephone connection (e.g., W-CDMA (UMTS), CDMA2000 (IS-856/IS-2000), etc.), a wired data connection (e.g., RS-232 (Electronic Industries Alliance/EIA), Ethernet (e.g., IEEE 802.3-2005, LAN/MAN CSMA/CD Access Method), power line communication (e.g., X10, IEEE P1675), USB (e.g., Universal Serial Bus 2.0 Specification)), etc., depending upon the circumstances.

The first device memory component 105 may be any device configured to store data. In this example, the first device memory 105 may store, among other things, a first device user application 106, a media file 107, a first device service manager application 108, and a first device offload manager application 109. In addition, the first device memory 105 may also store a first device network credential 110, a first device network invitation 111, first device identification information 112, and second device assigned identification information 113.

The first device user application 106 may be any application usable by a user. In this example, the first device user application 106 may be configured to facilitate exchanges of media files (e.g., photos, video files) between devices. So, in this example, the first user may use the first device user application 106 to send the media file 107, a photo image, to the second device 200.

The first device service manager application 108 may be an application configured to, among other things, serve as a middleware component. For example, in serving as a middleware component, the first device service manager application 108 may provide an application programming interface (API) by which applications, such as the first device user application 106, may interface with hardware components, such as the first device first transceiver 103 and the first device second transceiver 104.

So, from the application side, the first device service manager application 108 may be configured to capture user input (e.g., the user directing the application to send a photo) that may be used to direct the activities of the hardware components. From the hardware side, the first device service manager application 108 may facilitate an end-to-end data connection (e.g., a Wi-Fi connection) for use by an application (e.g., the first device user application 106). For example, the first device service manager application 108 may be configured to, among other things, generate or provide any information (e.g., device identification information) necessary to facilitate a data connection.

The first device offload manager application 109 may be an application configured to, among other things, serve as an interface between the first device service manager application 108 and hardware components. For example, as will be discussed in greater detail, the first device offload manager application 109 may be used to establish a Wi-Fi SoftAP personal area network (PAN) between the first device 100 and the second device 200, wherein the first device 100 may assume the role of both Wi-Fi PAN software-enabled access point (SoftAP) and a Wi-Fi PAN client. In this example, the second device 200 may operate as a Wi-Fi PAN client hosted by the first device 100.

The first device network credential 110 may be authentication information that may be used by another device (e.g., the second device 200) to establish a secure connection with the first device 100. In this example, the first device network credential 110 may include a network name and a network password. The first device network credential 110 may be generated by the first device offload manager application 109.

The first device network invitation 111 may be an invitation to another device (e.g., the second device 200) to join the Wi-Fi PAN initiated by the first device 100. The first device network invitation 111 may be generated by the first device offload manager application 109.

The first device identification information 112 may include information that may be used to identify the first device 100 to another device (e.g., the second device 200). For example, the first device identification information 112 may include an IP address of the first device 100, which may be used to identify the first device 100 as a SoftAP.

The second device assigned identification information 113 may include information generated by the first device 100 that may be used to identify another device (e.g., the second device 200) as a client on the Wi-Fi PAN hosted by the first device 100. For example, the second device identification information 113 may an IP address assigned to the second device 200 by the first device 100, which may be used to identify the second device 200 as a client. In this example, the first device 100 may be configured to transmit one or more of the first device network credential 110, the first device network invitation 111, the first device identification information 112, and the second device assigned identification information 113 to the second device via an invitation communication.

The second device 200 may be, among other things, any programmable machine that may carry out a sequence of logical operations. In this embodiment the second device 200 may be a user device such as a smart phone. The second device 200 may include a second device processor 201, a second device interface 202, a second device first transceiver 203, a second device second transceiver 204, and a second device memory component 205.

The second device processor 201 may include a processing component that may be utilized to execute computer-readable executable instructions. For example, as will be discussed in greater detail, the second device processor 201 may be configured to execute various software applications relating to a proximity-based coupling service.

The second device interface 202 may be a component configured to allow a user to interact with the user device 100. For example, in this embodiment, the user device interface 202 may be a smart phone screen including a graphical user interface (GUI). In other embodiments, the user device interface 202 may be a laptop screen, a tablet device screen, a desktop monitor, or the like.

The second device first transceiver 203 and the second device second transceiver 204 may be transmitter/receiver devices that enable the first device 200 to wirelessly communicate with other devices (e.g., the first device 100). In this embodiment, the second device first transceiver 203 may be configured to communicate wirelessly via Wi-Fi (e.g., LAN/MAN Wireless LANS (Wi-Fi). IEEE 802.16-2004), and the second device second transceiver 204 may be configured to Bluetooth (e.g., IEEE 802.15.1-2005, Wireless Personal Area Networks). In other embodiments, the first device first transceiver 203 and the first device second transceiver 204 may be configured to communicate wirelessly via various other wireless communication protocols.

The second device memory component 205 may be any device configured to store data. In this example, the second device memory 205 may store, among other things, a second device user application 206, a second device service manager application 207, a second device offload manager application 208, and a second device network profile 209.

The second device user application 206 may be any application usable by a user. In this example, similar to the first device application 106, the second device user application 206 may be configured to facilitate exchanges of media files (e.g., photos, video files) between devices. So, in this example, the second user may use the second device user application 206 to receive the media file 107 from the first device 100.

The second device service manager application 207 may be an application configured to, among other serve as a middleware component. For example, in serving as a middleware component, the second user service device manager application 207 may provide an application programming interface (API) by which applications, such as the second device user application 206, may interface with hardware components, such as the second device second transceiver 203 and the second device second transceiver 204.

So, from the application side, the second user service device manager application 207 may be configured to capture user input (e.g., the user directing the application to send a photo) that may be used to direct the activities of the hardware components. From the hardware side, the service manager application 207 may be configured to facilitate an end-to-end data connection (e.g., a Wi-Fi connection) for use by an application (e.g., the second device user application 206).

The second device offload manager application 208 may be an application configured to, among other things, serve as an interface between an application (e.g., the second device service manager application 207) and a hardware component. In this example, the second device offload manager application 208 may be configured to connect to a Wi-Fi PAN hosted by the first device 100 (i.e., where the first device 100 assumes the role of SoftAP), wherein the second device 200 assumes the role of a Wi-Fi PAN client. The second device offload manager application 208 may utilize the first device network credential 110 to establish the connection.

The second device network profile 209 may be profile information generated by the second device offload manager application 208 that may be used to connect to the Wi-Fi PAN hosted by the first device 100. The second device network profile 209 may be generated using the network credential 110.

The arrangement and numbering of blocks depicted in FIG. 1 is not intended to imply an order of operations to the exclusion of other possibilities. Those of skill in the art will appreciate that the foregoing systems and methods are susceptible of various modifications and alterations.

For example, in the embodiment described in FIG. 1, as discussed above, the first device service manager application 108 and the first device offload manager application 109 are separate applications. However, this need not necessarily be the case. In other embodiments, the first device offload manager application 109 may be part of the first device service manager application 108. Similarly, the second device off load manager application 208 may be part of the second device service manager application 207.

Figure 2:
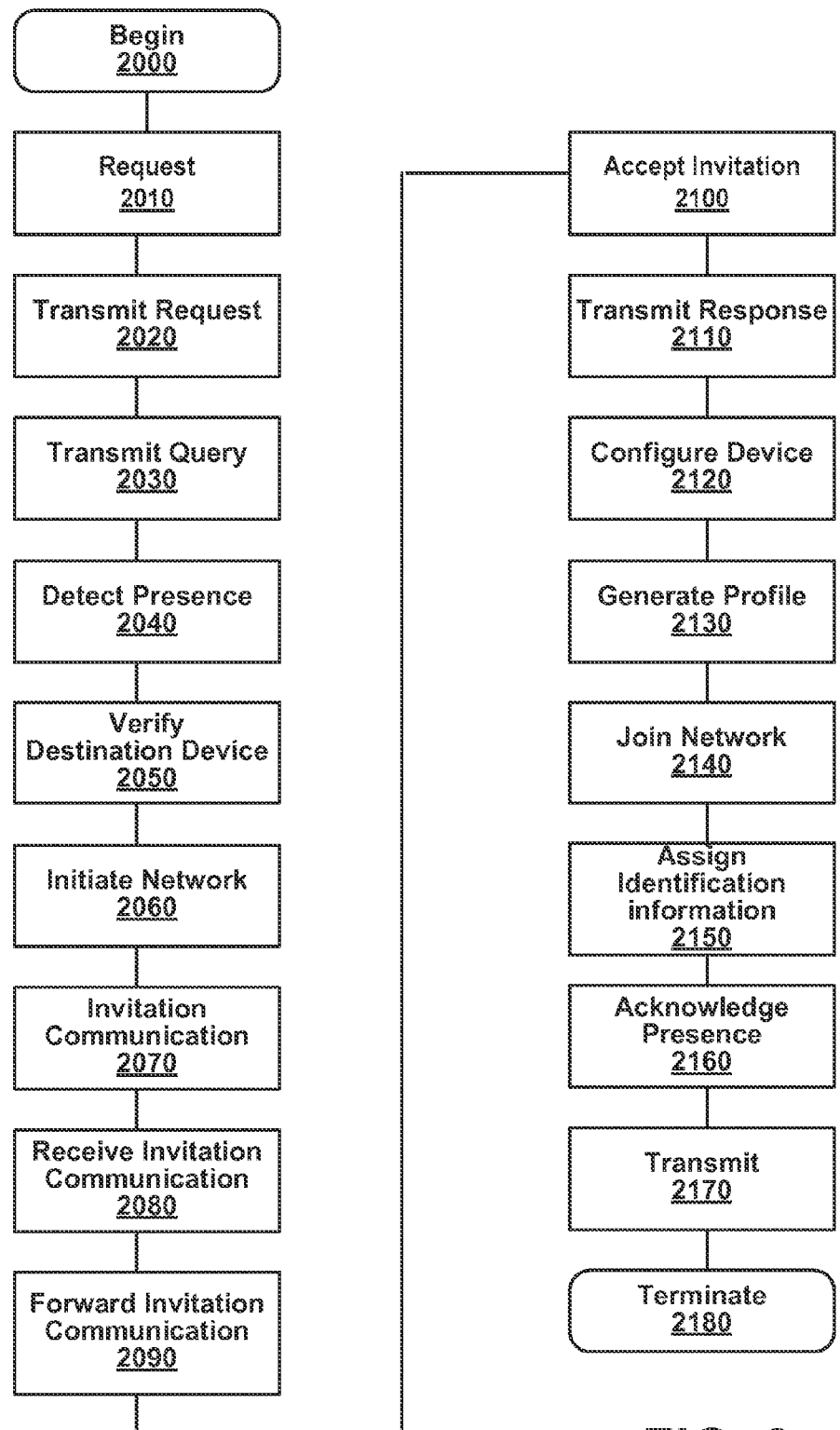
FIG. 2 is a flowchart of an example of a method of implementing a proximity-based coupling service in accordance with an embodiment of the invention.

Turning now to FIG. 2, a flowchart of an example of a method of implementing a proximity-based coupling service in accordance with an embodiment of the invention is shown. In this example, a first user may utilize a first device, such as the first device 100 (FIG. 1), to send a photo image to a second user utilizing a second device, such as the second device 200 (FIG. 1). In doing so, the first device may initiate a Wi-Fi PAN wherein the first device operates as a SoftAP and a client, and the second device operates as a client.

The method might be implemented as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method may be written in any combination of one or more programming languages, including an object oriented programming language such as Java, Smalltalk, C++ or the like and conventional procedural programming languages, such as the "C" programming language or similar programming languages.

The process may begin at processing block 2000. At processing block 2010, the first user may utilize a first device user application, such as the first device user application 106 (FIG. 1), to request a photo image, such as the media file 107 (FIG. 1), be sent to the second device. At processing block 2020, the first device user application may transmit the first user's request to a first device service manager application, such as the first device service manager application 108 (FIG. 1). At processing block 2030, the first device service manager application may transmit a query to a first device offload manager application, such as the first device offload manager application 109 (FIG. 1), to determine if there are any devices nearby.

At processing block 2040, the first device offload manager application may determine that the second device is nearby. In particular, the first device offload manager application may utilize a first device first transceiver, such as the first device first transceiver 104 (FIG. 1), to transmit a detection communication to detect the presence of the second device. The first device first transceiver may be configured to communicate via Bluetooth. The second device may utilize a second device first transceiver, such as the second device first transceiver 203 (FIG. 1), to acknowledge presence. The second device first transceiver may also be configured to communicate via Bluetooth. Upon receiving acknowledgement as to the presence of the second device, the first device offload manager may communicate the presence of the second device to the first device user application.

At processing block 2050, the first device user application may ask the first user to user to verify that the second device is the destination device (e.g., using a query displayed on a first device interface), and the first user may indicate that the second device is the destination for the photo image. At this point, at processing block 2060, the first device offload manager application may initiate a Wi-Fi PAN by generating a network credential, such as the first device network credential 110 (FIG. 1). The network credential may include a network name and a network password. In this Wi-Fi PAN, the first device may serve as SoftAP. The Wi-Fi PAN may be facilitated by a first device second transceiver, such as the first device second transceiver 104 (FIG. 1). The first device first transceiver may be configured to communicate via Wi-Fi.

At processing block 2070, the first device offload manager application may utilize the first device first transceiver to transmit an encrypted invitation communication to the second device. The invitation communication may include the network credential, an encryption key, a first device network invitation, such as the first device network invitation 111 (FIG. 1), and first device identification information, such as the first device identification information 112 (FIG. 1). The first device network invitation may be used to invite the second device to join the Wi-Fi PAN, while the first device identification information may be used to identify the first device as SoftAP of the Wi-Fi PAN.

At processing block 2080, the second device may receive the invitation communication. At processing block 2090, the invitation communication may be decrypted by a second device offload manager application, such as the second device offload manager application 208 (FIG. 1), and forwarded to a second device user application, such as the second device user application 206 (FIG. 1). The second device user application may then generate an invitation message to the user indicating that the first device would like to initiate a connection and send a media file. At processing block 2100, the user may accept the invitation. At processing block 2110, the second device user application may transmit an encrypted invitation response to the first device indicating the invitation has been accepted.

At processing block 2120, a second device service manager application, such as the second device service manager application 207 (FIG. 1), may direct the second device offload manager to configure the second device to join the Wi-Fi PAN hosted the first device. The second device may do so by utilizing a second device second transceiver, such as the second device second transceiver 204 (FIG. 1). The second device second transceiver may be configured to communicate via Wi-Fi.

At processing block 2130, the second device offload manager application may generate a second device network profile, such as the second device network profile 209 (FIG. 1). At processing block 2140, the second device offload manager application may utilize the network credential (i.e., the network name, the network password) sent in the invitation communication to join the Wi-Fi PAN.

At processing block 2150, upon recognizing the second device is connected to the Wi-Fi PAN, the first device offload manager application may assign second device identification information, such as the second device identification information 113 (FIG. 1), to the second device. The second device identification information may include an IP address, and may identify the second device as a client of the Wi-Fi PAN.

At processing block 2160, the first device offload manager may transmit the second device identification information for receipt by the first device service manager application. At this point, when the first device acknowledges the presence of the second device on the Wi-Fi PAN, the Wi-Fi connection may be complete. At processing block 2170, the first device may utilize the Wi-Fi connection to transmit a data communication including the photo image to the second device. At processing block 2180, the process may terminate.

The sequence and numbering of blocks depicted in FIG. 2 is not intended to imply an order of operations to the exclusion of other possibilities. Those of skill in the art will appreciate that the foregoing systems and methods are susceptible of various modifications, variations, and alterations.

For example, in the embodiment illustrated in FIG. 2, the wireless network utilizing a second communication protocol may be initiated as part of a process of sending a photo image from the first device to the second device. However, in embodiments of the present invention, the initiating a wireless network between two devices need not be limited to utilizing a user application. In other embodiments, initiating a wireless network between two devices need not be associated with implementing a user application at all.

Embodiments may therefore provide a method of implementing a proximity-based coupling service, comprising detecting, utilizing a first communication protocol, a presence of a second device by a first device and initiating a wireless network utilizing a second communication protocol, wherein the first device is to serve as a software-enabled access point (SoftAP). The method may also provide transmitting, utilizing the first communication protocol, an invitation communication to the second device, wherein the invitation communication includes an invitation to join the wireless network utilizing the second communication protocol, accepting, at the second device, the invitation to join the wireless network utilizing the second communication protocol, and configuring the second device to join the wireless network utilizing the second communication protocol.

In one example, the initiating the wireless network utilizing a second communication protocol includes generating a network credential, wherein the network credential includes a network name and a network password.

In one example, the invitation communication includes one or more of a network credential, an encryption key, and identification information for the first device.

In another example, configuring the second device to join the wireless network utilizing the second communication protocol includes generating a second device network profile.

In another example, the method may include assigning second device identification information to the second device.

In still another example, the invitation communication includes an indication that the first device is to serve as software-enabled access point (SoftAP).

In still another example, the second wireless communication protocol is Wi-Fi.

In yet another example, the method may include transmitting a data communication from the first device to the second device over the wireless network utilizing the second communication protocol.

Embodiments may also include at least one machine readable medium comprising a plurality of instructions that in response to being executed on a computing device, cause the computing device to carry out any of the examples of the aforementioned method, an apparatus for implementing a proximity-based coupling service, configured to perform any of the examples of the aforementioned method, and a system for implementing a proximity-based coupling service, comprising a processor and a memory device configured to perform the method of any of the examples of the aforementioned method.

Embodiments may also provide a method of implementing a proximity-based coupling service comprising detecting, utilizing a first communication protocol, a presence of a second device by a first device and initiating a wireless network utilizing a second communication protocol, wherein the first device is to serve as a software-enabled access point (SoftAP). The method may also include transmitting, utilizing the first communication protocol, an invitation communication to the second device, wherein the invitation communication includes an invitation to join the wireless network utilizing the second communication protocol and receiving an invitation response indicating the second device has accepted the invitation to join the wireless network utilizing the second communication protocol. In addition, the method may also include assigning identification information to the second device, wherein the identification information is to identify the second device as a client on the wireless network utilizing the second communication protocol and transmitting a data communication over the wireless network utilizing the second communication protocol.

In one example, the initiating the wireless network utilizing a second communication protocol includes generating a network credential, wherein the network credential includes a network name and a network password.

In still another example, the invitation communication includes one or more of a network credential, an encryption key, and identification information for the first device.

In another example, the method may include assigning second device identification information to the second device.

In still another example, the invitation communication includes an indication that the first device is to serve as software-enabled access point (SoftAP).

In another example, the second wireless communication protocol is Wi-Fi.

In yet another example, the invitation communication and the invitation response are encrypted.

Embodiments may also include at least one machine readable medium comprising a plurality of instructions that in response to being executed on a computing device, cause the computing device to carry out any of the examples of the aforementioned method, an apparatus for implementing a proximity-based coupling service, configured to perform any of the examples of the aforementioned method, and a system for implementing a proximity-based coupling service, comprising a processor and a memory device configured to perform the method of any of the examples of the aforementioned method.

Embodiments may also provide a method of implementing a proximity-based coupling service comprising receiving, utilizing a first communication protocol, an invitation communication, wherein the invitation communication includes an invitation to join a wireless network utilizing a second communication protocol and transmitting an invitation response indicating acceptance of the invitation to join the wireless network utilizing the second communication protocol. The method may also provide generating a network profile for the wireless network utilizing the second communication protocol and receiving a data communication over the wireless network utilizing the second communication protocol.

In one example, the invitation communication includes one or more of a network credential, an encryption key, and identification information for the first device.

In one example, the network credential includes a network name and a network password.

In another example, the method may include assigning device identification information to the second device.

In one example, the invitation communication includes an indication that a device transmitting the invitation communication is to serve as software-enabled access point (SoftAP).

In another example, the second wireless communication protocol is Wi-Fi.

Embodiments may also include at least one machine readable medium comprising a plurality of instructions that in response to being executed on a computing device, cause the computing device to carry out any of the examples of the aforementioned method, an apparatus for implementing a proximity-based coupling service, configured to perform any of the examples of the aforementioned method, and a system for implementing a proximity-based coupling service, comprising a processor and a memory device configured to perform the method of any of the examples of the aforementioned method.

Still another embodiment may provide a system comprising a first device and a second device, wherein the first device includes a first device processing component and a first device memory device. The first device may also include a detection module to detect, utilizing a first communication protocol, a presence of the second device, an initiation module to initiate a wireless network utilizing a second communication protocol, wherein the first device is to serve as a software-enabled access point (SoftAP), a invitation module to transmit, utilizing the first communication protocol, an invitation communication to the second device, wherein the invitation communication is to include an invitation to join the wireless network utilizing the second communication protocol. The first device may also include a first device receiving module to receive an invitation response indicating the second device has accepted the invitation to join the wireless network utilizing the second communication protocol, an assignment module to assign identification information to the second device, wherein the identification information is to identify the second device as a client on the wireless network utilizing the second communication protocol, and a data communication transmitting module to transmit a data communication over the wireless network utilizing the second communication protocol. The second device may include a second device processing component and a second device memory device. The second device may also include an acknowledgement module to acknowledge, utilizing the first communication protocol, the presence of the second device, a second device receiving module to receive the invitation communication to the second device, and an invitation response module to transmit, utilizing the first communication protocol, the invitation response. The second device may also include a network profile module to generate a network profile for the wireless network utilizing the second communication protocol and a data communication receiving module to receive the data communication over the wireless network utilizing the second communication protocol.

Yet another embodiment may provide at least one computer readable storage medium comprising a set of instructions which, if executed by a processor, cause a computer to detect, utilizing a first communication protocol, a presence of a second device by a first device and initiate a wireless network utilizing a second communication protocol, wherein the first device is to serve as a software-enabled access point (SoftAP). The set of instruction, if executed, may also cause a computer to transmit, utilizing the first communication protocol, an invitation communication to the second device, wherein the invitation communication is to include an invitation to join the wireless network utilizing the second communication protocol and receive an invitation response indicating the second device has accepted the invitation to join the wireless network utilizing the second communication protocol. In addition, the set of instructions, if executed, may also cause a computer to assign identification information to the second device, wherein the identification information is to identify the second device as a client on the wireless network utilizing the second communication protocol and transmit a data communication over the wireless network utilizing the second communication protocol.

In addition, another embodiment may provide at least one computer readable storage medium comprising a set of instructions which, if executed by a processor, cause a computer to receive, utilizing a first communication protocol, an invitation communication, wherein the invitation communication is to include an invitation to join a wireless network utilizing a second communication protocol and transmit an invitation response indicating acceptance of the invitation to join the wireless network utilizing the second communication protocol. The set of instructions, if executed, may also cause a computer to generate a network profile for the wireless network utilizing the second communication protocol and receive a data communication over the wireless network utilizing the second communication protocol.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Techniques described herein may therefore provide a feed-forward system that ensures both real-time operation of the consumer video pipeline and dynamic updating of the operating pipeline to deliver optimal visual perceptual quality and viewing experience. In particular, a discrete control system for the video pipeline can dynamically adapt operating points in order to optimize a global configuration of interactive component modules that are related to video perceptual quality. In a series configuration, the perceptual quality analysis module may be placed before the video processing pipeline and parameters determined for the post-processing pipeline may be used for the same frame. In the case of distributed computation of the quality analysis block or when perceptual quality analysis needs to be performed at intermediate points in the pipeline, the parameters determined using a given frame may be applied on the next frame to ensure real-time operation. Distributed computation is sometimes beneficial in reducing complexity as certain elements for perceptual quality computation may already be computed in the post-processing pipeline and can be re-used. Illustrated approaches may also be compatible with closed-loop control where the perceptual quality analysis is re-used at the output of the video processing pipeline to estimate output quality, which is also used by the control mechanism.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

I claim:

1. A method of implementing a proximity-based coupling service, comprising:
  detecting, utilizing a first communication protocol, a presence of a second device by a first device;
  initiating a wireless network utilizing a second communication protocol, wherein the first device is to serve as a software-enabled access point (SoftAP);
  transmitting, utilizing the first communication protocol, an invitation communication to the second device, wherein the invitation communication includes an invitation to join the wireless network utilizing the second communication protocol;

accepting, at the second device, the invitation to join the wireless network utilizing the second communication protocol; and configuring the second device to join the wireless network utilizing the second communication protocol.

2. The method of claim 1, wherein the initiating the wireless network utilizing a second communication protocol includes generating a network credential, wherein the network credential includes a network name and a network password.

3. The method of claim 1, wherein the invitation communication includes one or more of a network credential, an encryption key, and identification information for the first device.

4. The method of claim 1, wherein configuring the second device to join the wireless network utilizing the second communication protocol includes generating a second device network profile.

5. The method of claim 1, including assigning second device identification information to the second device.

6. The method of claim 1, wherein the invitation communication includes an indication that the first device is to serve as software-enabled access point (SoftAP).

7. The method of claim 1, wherein the second wireless communication protocol is Wi-Fi.

8. The method of claim 1, including transmitting a data communication from the first device to the second device over the wireless network utilizing the second communication protocol.

9. At least one machine readable medium comprising a plurality of instructions for implementing a proximity-based coupling service that in response to being executed on a computing device, cause the computing device to carry out a method according to claim 1.

10. An apparatus for implementing a proximity-based coupling service, comprising:
a user interface; and
logic configured to perform the method of claim 1.

11. A system for implementing a proximity-based coupling service, comprising:
a user interface;
a memory device; and
logic configured to perform the method of claim 1.

12. A method of implementing a proximity-based coupling service, comprising:
detecting, utilizing a first communication protocol, a presence of a second device by a first device;
initiating a wireless network utilizing a second communication protocol, wherein the first device is to serve as a software-enabled access point (SoftAP);
transmitting, utilizing the first communication protocol, an invitation communication to the second device, wherein the invitation communication includes an invitation to join the wireless network utilizing the second communication protocol;
receiving an invitation response indicating the second device has accepted the invitation to join the wireless network utilizing the second communication protocol;
assigning identification information to the second device, wherein the identification information is to identify the second device as a client on the wireless network utilizing the second communication protocol; and
transmitting a data communication over the wireless network utilizing the second communication protocol.

13. The method of claim 12, wherein the initiating the wireless network utilizing a second communication protocol includes generating a network credential, wherein the network credential includes a network name and a network password.

14. The method of claim 12, wherein the invitation communication includes one or more of a network credential, an encryption key, and identification information for the first device.

15. The method of claim 12, including assigning second device identification information to the second device.

16. The method of claim 12, wherein the invitation communication includes an indication that the first device is to serve as software-enabled access point (SoftAP).

17. The method of claim 12, wherein the second wireless communication protocol is Wi-Fi.

18. The method of claim 12, wherein the invitation communication and the invitation response are encrypted.

19. At least one machine readable medium comprising a plurality of instructions for implementing a proximity-based coupling service that in response to being executed on a computing device, cause the computing device to carry out a method according to claim 12.

20. An apparatus for implementing a proximity-based coupling service, comprising:
a user interface; and
logic configured to perform the method of claim 12.

21. A system for implementing a proximity-based coupling service, comprising:
a user interface;
a memory device; and
logic configured to perform the method of claim 12.

22. A method of implementing a proximity-based coupling service, comprising:
receiving, utilizing a first communication protocol, an invitation communication, wherein the invitation communication includes an invitation to join a wireless network utilizing a second communication protocol;
transmitting an invitation response indicating acceptance of the invitation to join the wireless network utilizing the second communication protocol;
generating a network profile for the wireless network utilizing the second communication protocol; and
receiving a data communication over the wireless network utilizing the second communication protocol.

23. The method of claim 22, wherein the invitation communication includes one or more of a network credential, an encryption key, and identification information for a first device.

24. The method of claim 23, wherein the network credential includes a network name and a network password.

25. The method of claim 22, including assigning device identification information to a second device.

26. The method of claim 22, wherein the invitation communication includes an indication that a device transmitting the invitation communication is to serve as software-enabled access point (SoftAP).

27. The method of claim 22, wherein the second wireless communication protocol is Wi-Fi.

28. At least one machine readable medium comprising a plurality of instructions for implementing a proximity-based coupling service that in response to being executed on a computing device, cause the computing device to carry out a method according to claim 22.

29. An apparatus for implementing a proximity-based coupling service, comprising:
a user interface; and
logic configured to perform the method of claim 22.

30. A system for implementing a proximity-based coupling service, comprising:
   a user interface;
   a memory device; and
   logic configured to perform the method of claim 22.

* * * * *